(12) United States Patent
Hashimoto

(10) Patent No.: US 7,133,336 B2
(45) Date of Patent: Nov. 7, 2006

(54) OPTICAL DISC REPRODUCING APPARATUS WITH FUNCTION OF DETECTING DIRECTION OF ROTATION OF DISC BASED ON MIRROR INFORMATION

(75) Inventor: Chiaki Hashimoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 509 days.

(21) Appl. No.: 10/621,869

(22) Filed: Jul. 17, 2003

(65) Prior Publication Data

US 2004/0017748 A1 Jan. 29, 2004

(30) Foreign Application Priority Data

Jul. 18, 2002 (JP) .............................. 2002-209891

(51) Int. Cl.
*G11B 7/00* (2006.01)
(52) U.S. Cl. .................................. 369/47.48; 369/53.14
(58) Field of Classification Search ...................... None
See application file for complete search history.

(56) References Cited

U.S. PATENT DOCUMENTS

| 6,366,077 | B1 | 4/2002 | Kim | |
|---|---|---|---|---|
| 6,678,221 | B1 * | 1/2004 | Fujimoto | ................. 369/44.29 |
| 6,990,048 | B1 * | 1/2006 | Ono et al. | ................. 369/44.28 |

FOREIGN PATENT DOCUMENTS

| JP | 49-89508 | 8/1974 |
|---|---|---|
| JP | 60-20327 | 2/1985 |
| JP | 60-191444 | 9/1985 |
| JP | 62-16249 | 1/1987 |
| JP | 7-32740 | 6/1995 |
| JP | 2000-125588 | 4/2000 |
| JP | 2001-78483 | 3/2001 |
| JP | 2002-74819 | 3/2002 |
| JP | 2004-22078 | 1/2004 |

OTHER PUBLICATIONS

Patent Abstracts of Japan, Publication No. 2002-074819, Publication Date: Mar. 15, 2002, 1 page.
Patent Abstracts of Japan, Publication No. 62-016249, Date of Publication: Jan. 24, 1987, 1 page.
Patent Abstracts of Japan, Publication No. 60-191444, Date of Publication: Sep. 28, 1985, 1 page.

(Continued)

*Primary Examiner*—Thang V. Tran
*Assistant Examiner*—Joseph Haley
(74) *Attorney, Agent, or Firm*—Osha Liang LLP

(57) ABSTRACT

As the result of the detection of the runaway of the optical disc when the light pickup cannot detect sync signal in the reproducing signal sent from the optical disc, the control circuit turns off the tracking servo mechanism which controls the tracking of the optical disc by the light pickup. The direction of rotation of the optical disc that is running away is detected by comparing the initial mirror count value obtained by counting for a predetermined period of time the mirror pulse detected in correspondence with the RF signal based on the reproducing signal, with the mirror count value during braking obtained by counting the mirror pulse for the predetermined period of time when the spindle motor is applied with the brake pulse. The brake signal working in the direction opposite to the detected direction of rotation is applied to the spindle motor so as to stop the rotation of the optical disc.

8 Claims, 5 Drawing Sheets

OTHER PUBLICATIONS

Patent Abstracts of Japan, Publication No. 60-020327, Date of Publication: Feb. 1, 1985, 1 page.

Japanese Patent Office Utility Model Laying-Open Gazette, No. 7-32740, Date of Laying Open: Jun. 16, 1995, 3 pages.

Patent Abstracts of Japan Publication No. 2000-125588, dated Apr. 28, 2000, 1 page.

Patent Abstracts of Japan Publication No. 2001-078483, dated Mar. 23, 2001, 1 page.

* cited by examiner

OPTICAL DISC REPRODUCING APPARATUS WITH FUNCTION OF DETECTING DIRECTION OF ROTATION OF DISC BASED ON MIRROR INFORMATION

BACKGROUND OF THE INVENTION

1. Field of the Invention

The present invention relates to an optical disc reproducing apparatus which reproduces information recorded on an optical disc, and more specifically, to an optical disc reproducing apparatus with the function of detecting the direction of rotation of the optical disc.

2. Description of the Background Art

In an optical disc reproducing apparatus with the function of detecting the direction of rotation of the disc, a spindle motor for driving the rotation of the optical disc is generally controlled by using a motor control signal generated based on a sync signal (frame sync) contained in a reproducing signal outputted from a light pick-up at the time of reproducing the optical disc. To be more specific, the spindle motor is controlled by a servo loop of a PLL (Phase Locked Loop) or the like, and the voltage according to the phase difference between the sync signal and the predetermined reference signal is used as a motor control signal for the spindle motor so as to control the rotation of the spindle motor.

In order to reproduce the information recorded on the optical disc, to begin with, a predetermined voltage is applied to the spindle motor so as to start the rotation of the spindle motor and the optical disc, which is followed by a phase comparison between the sync signal contained in the reproducing signal from the light pickup and a predetermined reference signal. In accordance with the results of the phase comparison, the spindle motor is accelerated until the number of rotation within a predetermined range is reached, and when the number of rotation is reached, the servo system with the PLL is employed. If the shift to the servo system with the PLL is unsuccessful for some reason after accelerating the rotation of the spindle motor, it causes a runaway phenomenon of the optical disc due to the abnormally high rate of rotation of the spindle motor, thereby making the rotation of the motor out of control.

For example, when an optical disc is shifted from one side to the other side for reproduction, the rotation of the spindle motor is accelerated until the light pickup moves to the position for reproduction on the optical disc. Consequently, the longer it takes for the light pickup to reach the proper position for reproduction, the higher rate of rotation of the spindle motor has until it finally exceeds the regulated rate of rotation, resulting in the occurrence of a runaway phenomenon of the optical disc.

Furthermore, for example, when the light from the light pickup is emitted on a mirror surface (region) having no track, which is out of the effective recording region of the optical disc, it becomes impossible to detect the sync signal and to employ the servo system with the PLL. This would sometimes cause the spindle motor to be accelerated until the optical disc runs away.

An apparatus with an FG (Frequency Generator) sensor for detecting the runaway of an optical disc is available. The configuration of an FG sensor 30 is shown in FIG. 7A. Generally, FG sensor 30 is provided to detect whether the spindle motor is rotating or not. FG sensor 30 is placed under the turntable and is composed of a combination of a reflective sheet 31 including light-reflective surfaces (silver parts) 32 and absorbance surfaces (black parts) 33 arranged alternately and a photo sensor 34.

In FG sensor 30, reflective sheet 31 rotates in the direction of an arrow 35 in synchronization with the rotation of the unillustrated spindle motor. Consequently, the repetitive pattern of the presence and absence of the reflective light in reflective surfaces 32 and absorbance surfaces 33 is detected as an output pulse signal 36 of a photo sensor 34 which receives the reflective light and in turn outputs an electric signal, and is supplied to a micro computer 37 of the optical disc reproducing apparatus. Micro computer 37 detects based on pulse signal 36 shown in FIG. 7B which is inputted from FG sensor 30 whether the spindle motor is rotating or not, and also can detect based on the cycle of pulse signal 36 whether the optical disc is running away or not due to the abnormal acceleration of the spindle motor. In the case of the runaway of the optical disc, micro computer 37 determines whether the overrunning optical disc has been stopped or not, based on the input of pulse signal 36, without applying the spindle motor with voltage. Specially providing FG sensor 30 for the detection of rotation of the disc would reverse the miniaturization of the apparatus.

Prior art techniques for controlling the runaway phenomenon of the optical disc without using FG sensor 30 include the optical disc player shown in Japanese Utility Model Laying-Open No. 7-32740; the device for controlling a DC motor shown in Japanese Patent Laying-Open No. 2000-125588; and the apparatus for detecting the rate of rotation of a DC spindle motor shown in Japanese Patent Laying-Open No. 2001-78483.

First, the optical disc player shown in Japanese Utility Model Laying-Open No. 7-32740 controls the runaway of the spindle motor so as to prevent the optical disc from running away by including: a runaway detection unit for detecting the runaway of the spindle motor which drives the rotation of the optical disc; a rotational direction detection unit for detecting the direction of rotation of the spindle motor at the time of the runaway of the spindle motor; and a brake signal supply unit for applying the spindle motor with a brake signal of the polarity according to the output of the rotational direction detection unit.

However, the runaway detection unit detects the runaway of the spindle motor by detecting the current from the spindle motor, and the rotational direction detection unit detects the direction of rotation of the spindle motor by the output voltage of the runaway detection unit. In other words, the runaway detection unit performs detection by using current, and the rotational direction detection unit performs detection by using voltage. Since current and voltage are likely to change with the operational condition, the detecting operation is not necessarily carried out in a stable manner.

The device for controlling a DC motor shown in Japanese Patent Laying-Open No. 2000-125588 controls the runaway of the DC motor so as to prevent the optical disc from running away by including: an intermittent braking voltage supply unit which intermittently supplies the DC motor with a braking voltage of the polarity able to electrically brake the DC motor (corresponding to a spindle motor); a rotational direction determination unit which reverts the rotational direction of the DC motor by detecting the polarity of the back electromotive force of the DC motor while the DC motor is not supplied with a braking voltage; and a controller which determines whether the direction of rotation of the DC motor has been reverted while the stopping of the DC motor is under control, and suspends the supply of the intermittent braking voltage to the DC motor.

The rotational direction determination unit detects the polarity of the back electromotive force of the DC motor; however, the voltage level of the back electromotive force is fairly low and unstable, making it difficult to obtain a stable determining operation.

The apparatus for detecting the rate of rotation of a DC spindle motor shown in Japanese Patent Laying-Open No. 2001-78483 controls the runaway of the spindle motor so as to prevent the optical disc from running away by including: a current-to-voltage converter which detects and converts a current supplied to the spindle motor into a voltage; an analog-to-digital converter which converts the analog voltage outputted from the current-to-voltage converter into a digital signal; and a controller which detects the rate of rotation of the spindle motor using the digital signal outputted from the analog-to-digital converter and controls the spindle motor in accordance with the detected rate of rotation.

In this technique, the direction of rotation of the spindle motor is detected by using the voltage which is based on the current applied to the spindle motor. However, the current is likely to change under load conditions, so it is difficult to keep stabilizing the operation of detecting the direction of rotation of the optical disc that is running away.

Besides the techniques mentioned above, it is also known to bring the overrunning optical disc to the stop mode by making a timer count the time from the start of the runaway without applying voltage on the spindle motor for a predetermined period of time and by determining that the optical disc has been stopped after the predetermined period of time. In this art, it takes too much time to bring the optical disc which has started to run away to the stop mode. As another problem, if the brake signal in the normal direction of rotation is applied to the spindle motor while the optical disc is rotating in the reverse direction, the optical disc is accelerated in the reverse direction of rotation and may be unable to be stopped.

SUMMARY OF THE INVENTION

An object of the present invention is to provide an optical disc reproducing apparatus which can quickly detect the direction of rotation of an optical disc.

Another object of the present invention is to provide an optical disc reproducing apparatus which can securely stop the optical disc that is running away.

In order to achieve the above objects, according to an aspect of the present invention, an optical disc reproducing apparatus includes a spindle motor for driving the rotation of the optical disc and a light pickup. The light pickup emits laser light onto the optical disc and in turn receives the reflective light from the optical disc under the tracking control of a tracking servo mechanism in order to scan and reproduce information recorded on the optical disc.

The optical disc reproducing apparatus further includes a tracking servo off unit which turns off the tracking servo mechanism after it has been shown that the laser light onto the optical disc has attained proper focus based on a focus error signal contained in the reproducing signal outputted from the light pickup; a first count value calculation unit which counts the initial mirror count value by counting for a predetermined period of time the mirror pulse detected based on an RF signal when the tracking servo off unit turns off the tracking servo mechanism; a second count value calculation unit which calculates the mirror count value during braking by counting for the predetermined period of time the mirror pulse detected based on the RF signal; and a rotational direction detection unit which detects the direction of rotation of the optical disc based on the results of a comparison between the initial mirror count value calculated by the first count value calculation unit and the mirror count value during braking calculated by the second count value calculation unit.

In order to brake the optical disc that is running away, the spindle motor is applied with the brake signal in the reverse direction of rotation when the optical disc is detected to be rotating in the normal direction by the rotational direction detection unit, and is applied with the brake signal in the normal direction of rotation when the optical disc is detected to be rotating in the reverse direction.

According to the above-mentioned optical disc reproducing apparatus, when a runaway phenomenon of the optical disc occurs, the tracking servo mechanism is turned off. Based on the RF signal corresponding to the reproducing signal outputted from the light pickup at this moment, the mirror pulse which develops every time a mirror surface is scanned is counted for the predetermined period of time, and this count value becomes the initial mirror count value.

Then, when the brake signal is applied to the spindle motor, the above-mentioned mirror pulse is counted for the predetermined period of time, and this count value is made as the mirror count value during braking. Later, the initial mirror count value and the mirror count value during braking are compared with each other so as to detect the direction of rotation of the optical disc based on the comparison results.

Here, when the optical disc is detected to be rotating in the normal direction, the spindle motor is applied with the brake signal in the reverse direction of rotation, whereas when the optical disc is detected to be rotating in the reverse direction, the spindle motor is applied with the brake signal in the normal direction of rotation. Thus the braking of the spindle motor is controlled, so that the optical disc can be securely stopped according to the direction of its overrun.

Thus, according to the above-described optical disc reproducing apparatus, when the runaway of the spindle motor causes a runaway phenomenon of the optical disc, even if the direction of rotation of the optical disc is lost track of, the direction of rotation of the optical disc can be quickly detected by using the mirror count values, without making use of the level of the current or voltage of the spindle motor or using the FG sensor. This can provide high precision in detecting the direction of rotation, making it possible to securely stop the optical disc that is running away.

According to another aspect of the present invention, an optical disc reproducing apparatus includes a spindle motor which drives the rotation of an optical disc and a light pickup. The light pickup emits laser light onto the optical disc and in turn receives the reflective light from the optical disc under the tracking control of a tracking servo mechanism in order to scan and reproduce information recorded on the optical disc. The optical disc reproducing apparatus controls the spindle motor based on the sync signal contained in the reproducing signal outputted from the light pickup at the time of reproduction. For these operations, the optical disc reproducing apparatus further includes a mirror detection unit which detects mirror information about the scanned mirror surface on the optical disc, based on the RF (radio frequency) signal corresponding to the reproducing signal, and a control unit which detects the direction of rotation of the optical disc, based on the mirror information detected by the mirror detection unit, when the optical disc runs away.

According to the above-described optical disc reproducing apparatus, when a runaway phenomenon of the optical disc occurs, the direction of rotation of the optical disc is detected from the mirror information based on the RF signal corresponding to the reproducing signal.

Therefore, when the runaway of the spindle motor causes a runaway phenomenon of the optical disc, even if the direction of rotation of the optical disc is lost track of, it can be quickly detected by using the mirror information, without making use of the level of the current or voltage of the spindle motor or using the FG sensor.

The above-mentioned rotation control unit preferably applies the spindle motor with the brake signal in the direction opposite to the detected direction of rotation.

Therefore, when the optical disc is detected to be rotating in the normal direction, the spindle motor is applied with the brake signal in the reverse direction of rotation, whereas when the optical disc is detected to be rotating in the reverse direction, the spindle motor is applied with the brake signal in the normal direction of rotation. Thus the braking of the spindle motor is controlled, so that the optical disc can be securely stopped.

The direction of rotation of the above-mentioned optical disc is preferably detected by comparing the initial mirror count value obtained by counting the mirror pulse for the predetermined period of time every time a mirror surface which is detected based on the RF signal is scanned and the mirror count value during braking obtained by counting the mirror pulse for the predetermined period of time which is detected based on the RF signal when the spindle motor is applied with the brake signal.

Therefore, when the runaway of the spindle motor causes a runaway phenomenon of the optical disc, even if the direction of rotation of the optical disc is lost track of, it can be detected by using the mirror count values, without making use of the level of the current or voltage of the spindle motor or using the FG sensor.

The above-mentioned rotation control unit preferably includes: a first count value calculation unit which counts the initial mirror count value by counting for the predetermined period of time the mirror pulse detected based on the RF signal when the tracking servo mechanism, which controls the tracking of the optical disc by the light pickup, is turned off; a second count value calculation unit which calculates the mirror count value during braking by counting for the predetermined period of time the mirror pulse detected based on the RF signal when the spindle motor is applied with the brake signal; and a rotational direction detection unit which detects the direction of rotation of the optical disc based on the results of a comparison between the initial mirror count value calculated by the first count value calculation unit and the mirror count value during braking calculated by the second count value calculation unit.

In braking the optical disc that is running away, the spindle motor is applied with the brake signal in the reverse direction of rotation when the optical disc is detected to be rotating in the normal direction, and is applied with the brake signal in the normal direction of rotation when the optical disc is detected to be rotating in the reverse direction.

Thus, when the runaway of the spindle motor causes a runaway phenomenon of the optical disc, even if the direction of rotation of the optical disc is lost track of, it can be detected by using the mirror count values, without making use of the level of the current or voltage of the spindle motor or using the FG sensor. As a result, the spindle motor is applied with the brake signal in the direction opposite to the detected direction of rotation, making it possible to securely stop the optical disc that is running away.

The above-mentioned rotation control unit preferably further includes a tracking servo off unit. The tracking servo off unit turns off the tracking servo mechanism after it has been shown that the laser light onto the optical disc has attained proper focus based on a focus error signal contained in the reproducing signal outputted from the light pickup before the calculation of the initial mirror count value of the first count value calculation unit.

Since the tracking servo mechanism is turned off by the tracking servo off unit before the calculation of the mirror count value for detecting the rotational direction, the mirror pulse can be securely generated. Consequently, when the runaway of the spindle motor causes a runaway phenomenon of the optical disc, even if the direction of rotation of the optical disc is lost track of, it can be detected by using the mirror count value of the generated mirror pulse, without making use of the level of the current or voltage of the spindle motor or using the FG sensor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiment of the present invention will be described in detail as follows, with reference to the drawings.

Figure 1:
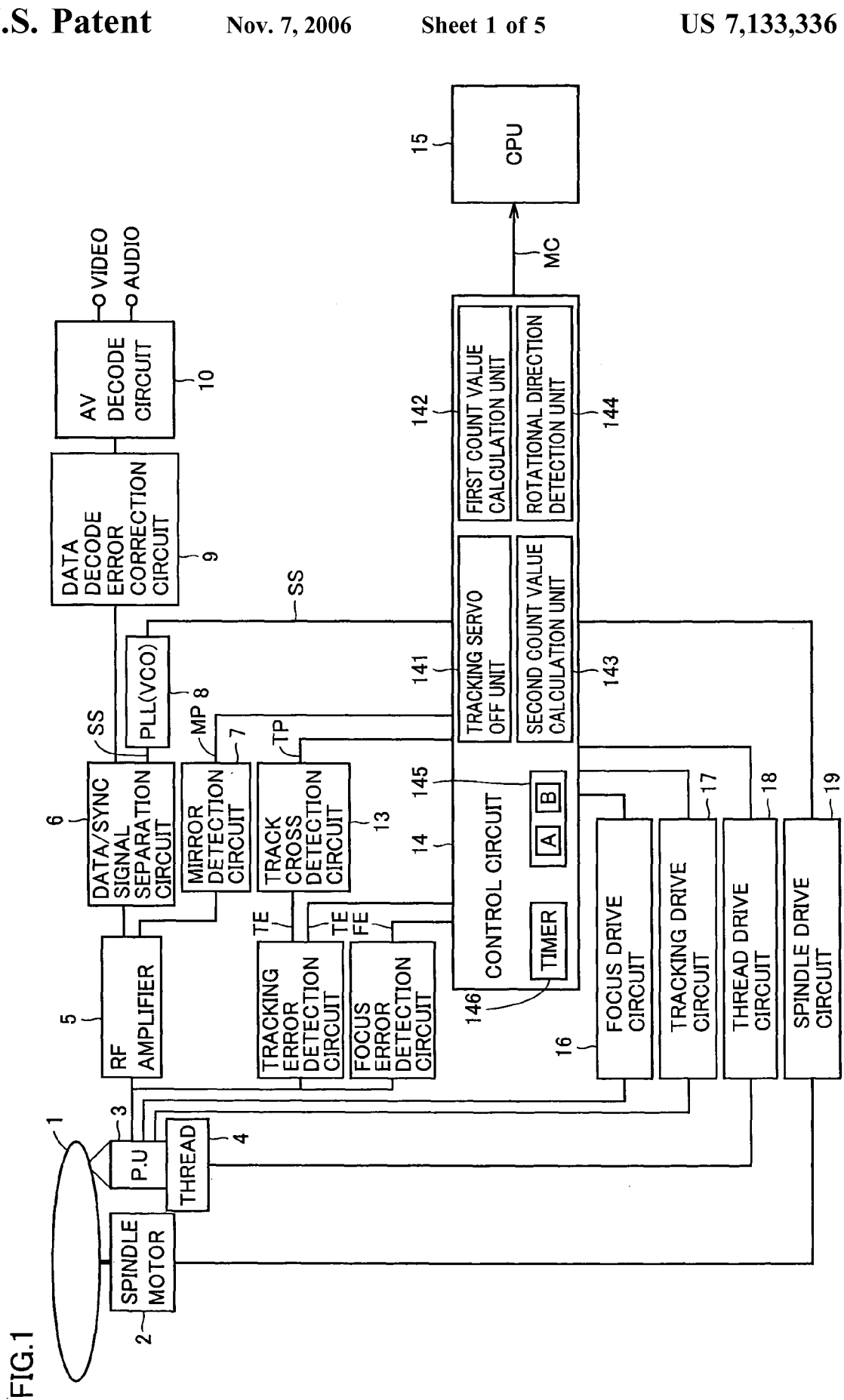
FIG. 1 shows the structure of the optical disc reproducing apparatus of the embodiment of the present invention.

FIG. 1 shows the structure of the optical disc reproducing apparatus of the embodiment of the present invention. In FIG. 1 the optical disc reproducing apparatus includes: a light pickup 3 which emits laser light in order to reproduce information recorded on an optical disc 1 as the recording medium and in turn receives reflective light from optical disc 1; a spindle motor 2 which drives the rotation of optical disc 1; a spindle drive circuit 19 which drives spindle motor 2; a tracking drive circuit 17 which drives an actuator (not illustrated) for performing the tracking servo of light pickup 3; a focus drive circuit 16 which drives an actuator (not illustrated) for the focus servo mechanism of light pickup 3;

a thread 4 which moves light pickup 3 in the direction of the radius of optical disc 1; and a thread drive circuit 18 which drives thread 4.

The optical disc reproducing apparatus further includes: an RF amplifier 5 which generates and amplifies an RF (Radio Frequency) signal from the reproducing signal (reading signal) inputted from light pickup 3 at the time of reproduction of optical disc 1; a PLL 8 including a VCO (Voltage Controlled Oscillator); a data/sync signal separation circuit 6 which inputs the RF signal from RF lamp 5 and separates data from a sync signal SS; a data decode error correction circuit 9 which performs error check by inputting and decoding the data separated by data/sync signal separation circuit 6, and when the data has an error, outputs correct data by performing error correction; and an AV (Audio Video) decode circuit 10 which inputs the correct data from data decode error correction circuit 9, decodes them and outputs video and audio signals.

This optical disc reproducing apparatus further includes: a mirror detection circuit 7 which detects a mirror signal indicative of the mirror surface having no track on the optical disc contained in the RF signal sent from RF amplifier 5 and outputs a mirror pulse MP; a tracking error detection circuit 11 which detects a tracking error signal TE contained in the reproducing signal sent from light pickup 3; a focus error detection circuit 12 which detects a focus error signal FE contained in the reproducing signal sent from the light pickup; and a track cross detection circuit 13 which detects a track cross based on tracking error signal TE sent from tracking error detection circuit 11 and outputs a track pulse TP.

The optical disc reproducing apparatus further includes a control circuit 14 which controls each of the above-mentioned circuits in accordance with a CPU (Central Processing Unit) 15 which performs the processing of the entire apparatus. Control circuit 14 includes: a tracking servo off unit 141 which halts the tracking servo mechanism for turning off the tracking servo mechanism prepared in the apparatus in order to control the tracking of optical disc 1 by light pickup 3 after it has been shown that the laser light onto optical disc 1 has attained proper focus based on focus error signal FE contained in the reproducing signal outputted from light pickup 3; a first count value calculation unit 142 which calculates the initial mirror count value by counting mirror pulse MP corresponding to the mirror signal contained in the reproducing signal outputted from light pickup 3 for a predetermined period of time when the tracking servo mechanism is turned off by tracking servo off unit 141; a second count value calculation unit 143 which calculates the mirror count value during braking by counting mirror pulse MP corresponding to the mirror signal contained in the reproducing signal outputted from light pickup 3 for the predetermined period of time when spindle motor 2 is applied with the brake signal; a rotational direction detection unit 144, a memory 145, and a timer 146.

Rotational direction detection unit 144 detects the direction of rotation of optical disc 1 by comparing the initial mirror count value calculated by first count value calculation unit 142 and the mirror count value during braking calculated by second count value calculation unit 143. In braking optical disc 1 that is rotating, control circuit 14 applies spindle motor 2 with the brake signal in the reverse direction of rotation via spindle drive circuit 19 when optical disc 1 is detected to be rotating in the normal direction by rotational direction detection unit 144, whereas control circuit 14 applies spindle motor 2 with the brake signal in the normal direction of rotation when optical disc 1 is detected to be rotating in the normal direction.

Information MC about the mirror count values calculated by first count value calculation unit 142 and second count value calculation unit 143 is supplied to CPU 15.

Mirror pulse MP will be described as follows. Optical disc 1 is provided with tracks and pits arranged along the tracks which are the effective regions for recording information, and with mirror surfaces which are the regions where information among the tracks or among pits are not recorded.

When laser light from light pickup 3 is emitted at the time of reading information (reproduction), the laser light is absorbed (not reflected) in the tracks or pits, and is almost entirely reflected on the mirror surfaces. The length of the pits depends on the information to be recorded, so the signal read by scanning the pits is derived as the RF signal.

While the tracking servo mechanism is on, the laser light follows the pits, whereas when the tracking servo mechanism is turned off, the direction of scanning the laser light by the decentering of optical disc 1 becomes the direction of the radius of optical disc 1. Every time the laser light crosses one track, one pulse of track pulse TP is detected by the RF signal. Since the laser light crosses the mirror surfaces at the same time, every time the laser light crosses a mirror surface, one pulse of mirror pulse MP is detected. In order to find the beginning of information on optical disc 1, light pickup 3 is moved from the current position to the predetermined beginning position. During this operation, the laser light crosses the tracks and the mirror surfaces alternately, so the number of tracks the laser light has crossed can be detected by counting the number of track pulse TP, and also can be detected by counting the number of mirror pulse MP.

Figure 2A:
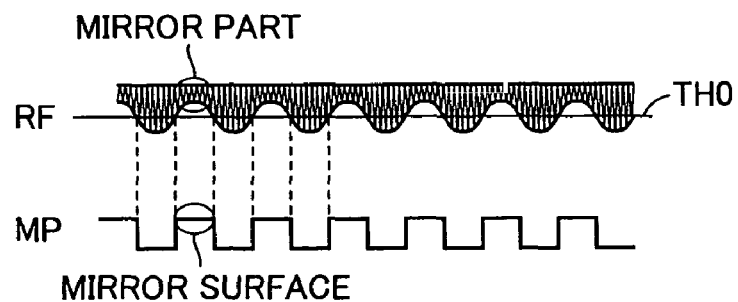
FIGS. 2A and 2B show the signal waveforms of a mirror pulse MP and a track pulse TP in association with the signal waveforms of signal RF and a focus error signal FE, respectively when the tracking servo is off.
Figure 2B:
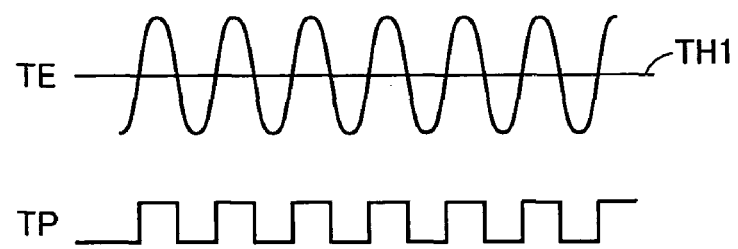
Figure 3:
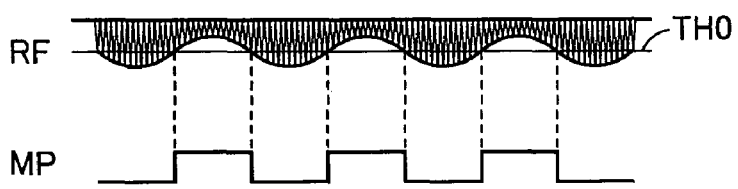
FIG. 3 shows the signal waveforms of the RF signal and mirror pulse MP corresponding to the RF signal when the brakes are applied to the optical disc rotating in the normal direction while the tracking servo is off.
Figure 4:
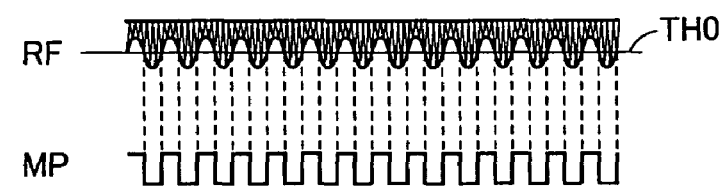
FIG. 4 shows the signal waveforms of the RF signal and mirror pulse MP corresponding to the RF signal when the brakes are applied to the optical disc rotating in the reverse direction while the tracking servo is off.

FIGS. 2A, 3 and 4 show the signal waveforms of the RF signal (shown as RF in the waveforms) and mirror pulse MP corresponding to the RF signal while the tracking servo mechanism is off. FIG. 2B shows the signal waveforms of tracking error signal TE and track pulse TP corresponding to signal TE while the tracking serve mechanism is off. FIG. 2A shows the signal waveforms of the RF signal and mirror pulse MP corresponding to the RF signal while the tracking servo mechanism is off (no brake is applied to the spindle motor). Mirror pulse MP shown in FIG. 2A is a signal which develops in correspondence with the RF signal, and which detects the number of mirror surfaces on optical disc 1 scanned by the laser light of light pickup 3.

Mirror pulse MP shown in FIGS. 2A, 3 and 4 can be detected by slicing the waveform of the envelope of the corresponding RF signal by a predetermined threshold value TH0. Track pulse TP shown in FIG. 2B can be detected by slicing the waveform of the corresponding tracking error signal TE by a predetermined threshold value TH1.

The count value obtained by counting mirror pulse MP for the predetermined period of time while the tracking servo mechanism is off is stored as an initial mirror count value A in memory 145 of control circuit 14.

FIG. 3 shows the signal waveforms of the RF signal of the reproducing signal outputted from light pickup 3 and mirror pulse MP corresponding to the RF signal when control circuit 14 applies spindle motor 2 with the brake signal via spindle drive circuit 19 while optical disc 1 is rotating in the normal direction. The count value obtained by counting mirror pulse MP of FIG. 3 for the predetermined period of time is stored in memory 145 as a mirror count value B during braking. In this case, the brake makes optical disc 1 rotate in the direction opposite to the normal direction, so mirror count value B during braking gets smaller than initial mirror count value A (see FIGS. 2A and 3).

FIG. 4 shows the signal waveforms of the RF signal of the reproducing signal outputted from light pickup 3 and mirror pulse MP corresponding to the RF signal when control circuit 14 applies spindle motor 2 with the brake signal via spindle drive circuit 19 while optical disc 1 is rotating in the reverse direction (opposite to the normal direction). The count value obtained by counting mirror pulse MP for the predetermined period of time is stored in memory 145 of control circuit 14 as mirror count value B during braking. In this case, mirror count value B during braking gets larger than initial mirror count value A (see FIGS. 2A and 4). The reason for this is that the brake signal makes optical disc 1 that is rotating in the normal direction rotate in the direction that applies brakes (reverse direction), and optical disc 1 that is rotating in the reverse direction increase the rate of rotation in the reverse direction. Thus, mirror count value B during braking gets larger than initial mirror count value A (see FIGS. 2A and 4).

Figure 5:
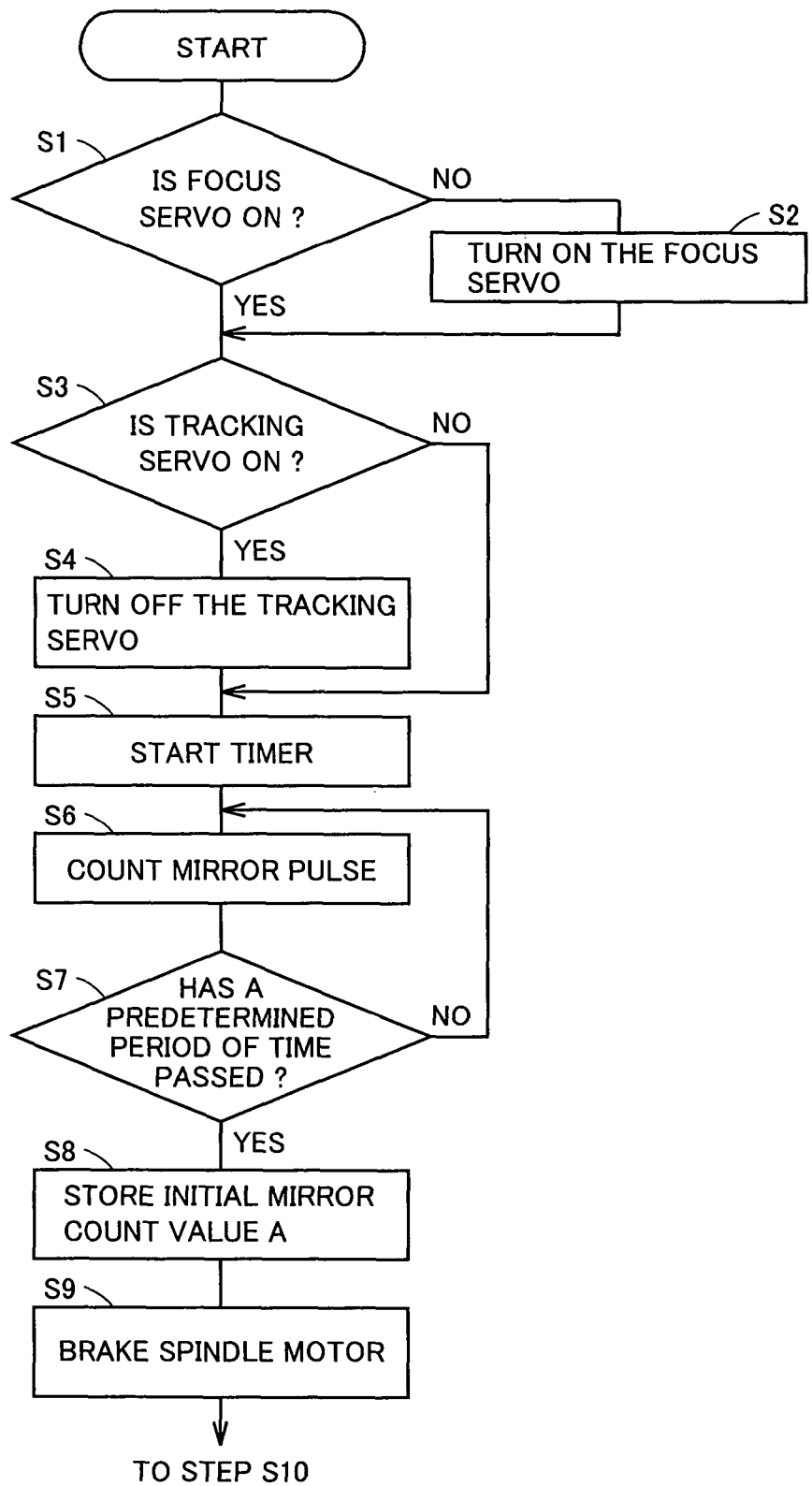
FIG. 5 is a flowchart depicting the processing to deal with optical disc 1 that is running away.
Figure 6:
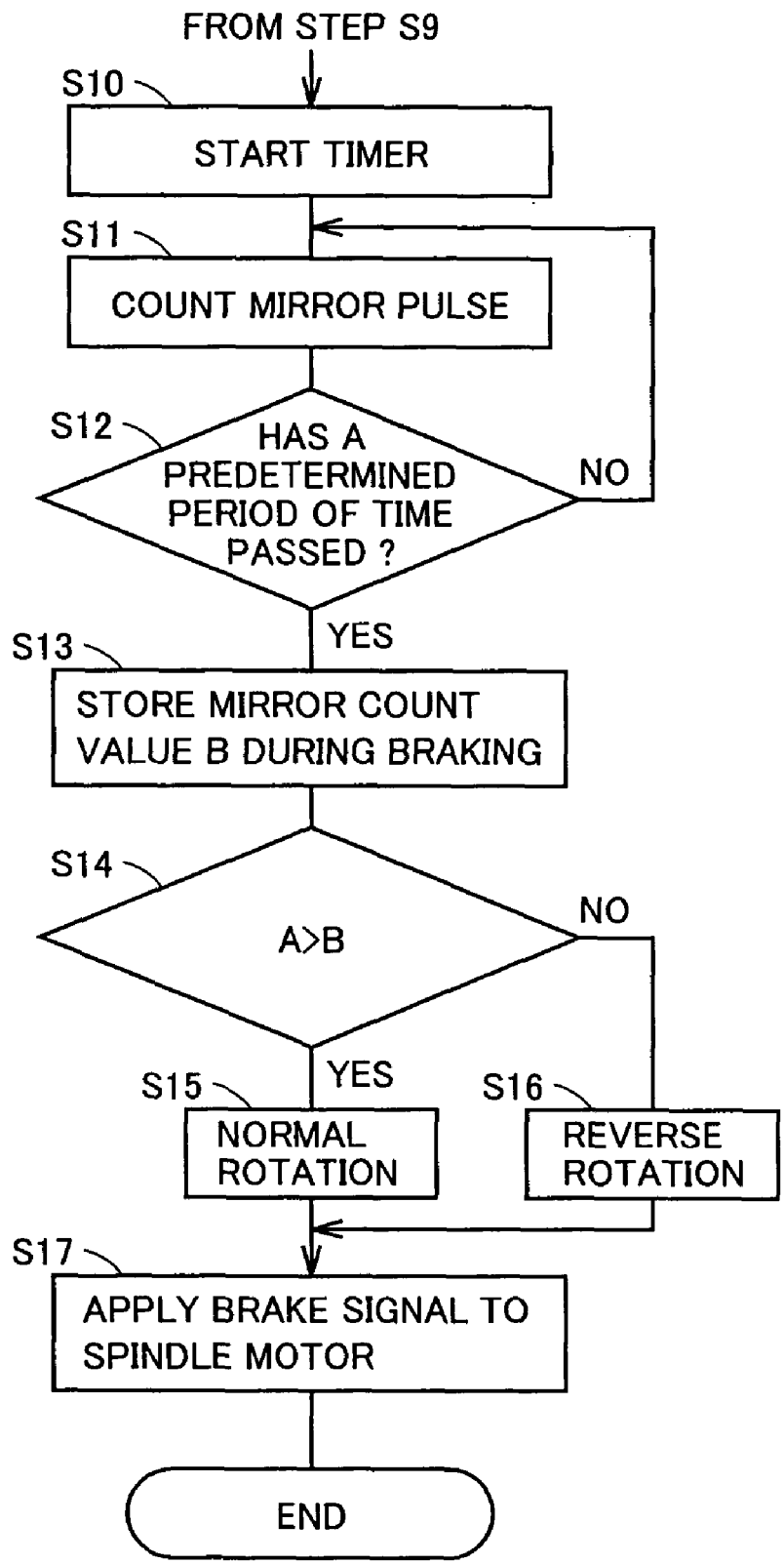
FIG. 6 is a flowchart depicting the processing to deal with optical disc 1 that is running away.
Figure 7A:
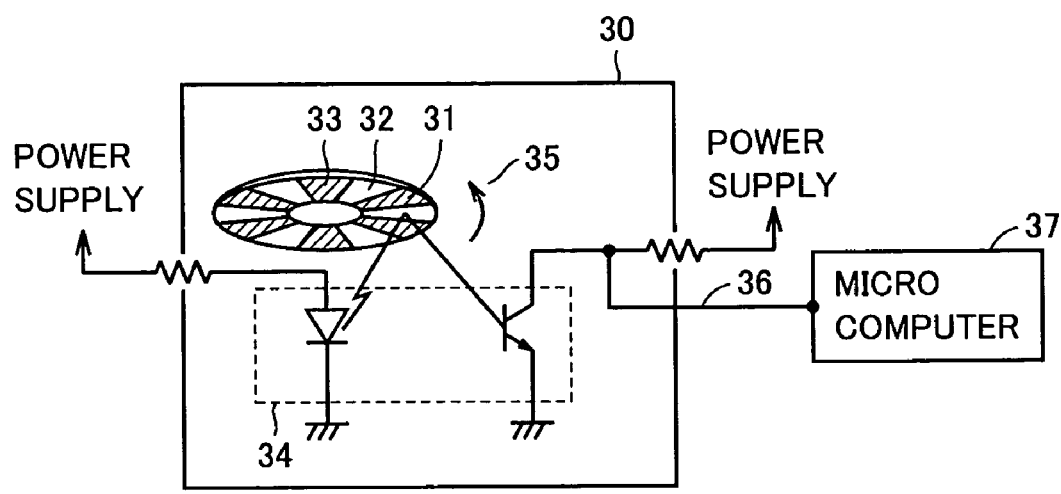
FIGS. 7A and 7B show the structure of a conventional FG sensor and the pulse signal, respectively.
Figure 7B:

FIGS. 5 and 6 show a flowchart depicting the processing to deal with optical disc 1 that is running away. If light pickup 3 fails to detect sync signal SS from optical disc 1 for some reason, and makes CPU 15 unable to control the rate of rotation of spindle motor 2 via control circuit 14, then spindle motor 2 accelerates and runs away, making optical disc 1 run away.

Control circuit 14, which has detected the runaway of optical disc 1 based on the absence of the detection of sync signal SS from optical disc 1, executes the following processings by using tracking servo off unit 141, first count value calculation unit 142, second count value calculation unit 143, rotational direction detection unit 144, memory 145, timer 146, and other units.

To begin with, it is determined whether the focus servo mechanism, which controls the focusing of the laser light onto optical disc 1 based on focus error signal FE contained in the reproducing signal outputted from light pickup 3, is on or not (step S1), when it is not on, the focus servo mechanism is turned on so as to set the focus on a proper position (track) on optical disc 1 (step S2).

After it has been shown that the focus of the laser light has been set in the proper position, it is determined whether the tracking servo mechanism which controls the tracking of optical disc 1 by light pickup 3 is on or not (step S3), and when it is on, the tracking servo mechanism is turned off (step S4).

After this, the timer is started (step S5); mirror pulse MP corresponding to the RF signal of the reproducing signal outputted from light pickup 3 is counted for a predetermined period of time by using timer 146 (steps S6 and S7); and initial mirror count value A is calculated and stored in memory 145 (step S8).

Then, the brake signal is applied to spindle motor 2 to brake it (step S9), and timer 146 is started (step S10). At this moment, mirror pulse MP corresponding to the RF signal in the reproducing signal outputted from light pickup 3 is counted for the predetermined period of time by using timer 146 (steps S11 and S12), and mirror count value B during braking is calculated and stored in memory 145 (step S13).

Later, the direction of rotation of optical disc 1 is detected by comparing initial mirror count value A and mirror count value B during braking (step S14). When initial mirror count value A is larger than mirror count value B during braking, optical disc 1 is determined to be rotating in the normal direction (step S15), whereas when mirror count value B during braking is larger than initial mirror count value A, optical disc 1 is determined to be rotating in the reverse direction (step S16).

After determining the direction of rotation of optical disc 1, in order to stop optical disc 1 that is running away, control circuit 14 applies spindle motor 2 with the brake signal via spindle drive circuit 19 (step S17). To be more specific, the rotation of optical disc 1 is stopped by applying spindle motor 2 with the brake signal working in the reverse direction of rotation when optical disc 1 is running away in the normal direction of rotation, and with the brake signal working in the normal direction of rotation when optical disc 1 is running away in the reverse direction of rotation.

As described hereinbefore, according to the present embodiment, when the runaway of spindle motor 2 causes a runaway phenomenon of optical disc 1, even if CPU 15 loses track of the direction of rotation of optical disc 1, control circuit 14 can detect it quickly and accurately by using the count values of mirror pulse MP, without making use of the level of the current or voltage of spindle motor 2 or using the FG sensor. This can secure to stop optical disc 1 that is running away.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc reproducing apparatus comprising:
   a spindle motor which drives the rotation of an optical disc;
   a light pickup which emits laser light to said optical disc and in turn receives reflective light from said optical disc in order to scan and reproduce information recorded on said optical disc;
   a motor control unit which controls said spindle motor based on a sync signal contained in a reproducing signal output from said light pickup at the time of reproduction;
   a mirror detection unit which detects mirror information in relation to scanned mirror surfaces on said optical disc based on an RF signal corresponding to said reproducing signal when said optical disc runs away; and
   a rotation control unit which detects the direction of rotation of said optical disc based on said mirror information detected by said mirror detection unit,
   wherein the direction of rotation of said optical disc is detected by comparing an initial mirror count value obtained by counting a mirror pulse for a predetermined period of time every time said mirror surface which is detected based on said RF signal is scanned and a mirror count value during braking obtained by counting said mirror pulse for the predetermined period which is detected based on said RF signal when said spindle motor is applied with a brake signal.

2. The optical disc reproducing apparatus according to claim 1 further comprising:
   a tracking servo mechanism which controls the tracking of said optical disc by said light pickup,
      wherein said rotation control unit includes:
         first count value calculation means which calculates said initial mirror count value by counting for the predetermined period of time said mirror pulse detected based on said RF signal when said tracking servo mechanism is turned off;

second count value calculation means which calculates a mirror count value during braking by counting for the predetermined period of time said mirror pulse detected based on said RF signal when said spindle motor is applied with said brake signal; and rotational direction detection means which detects the direction of rotation of said optical disc based on the results of a comparison between said initial mirror count value calculated by said first count value calculation means and said mirror count value during braking calculated by said second count value calculation means, in braking said optical disc that is running away, said spindle motor is applied with said brake signal in the reverse direction of rotation when said optical disc is detected to be rotating in the normal direction by said rotational direction detection means, and is applied with said brake signal in the normal direction of rotation when said optical disc is detected to be rotating in the reverse direction.

3. The optical disc reproducing apparatus according to claim 2, wherein said rotation control unit further includes tracking servo off means which turns off said tracking servo mechanism, after it has been shown that the laser light onto said optical disc has attained proper focus based on a focus error signal contained in said reproducing signal outputted from said light pickup before the calculation of said initial mirror count value of said first count value calculation means.

4. An optical disc reproducing apparatus comprising:
a spindle motor which drives the rotation of an optical disc;
a light pickup which emits laser light to said optical disc and in turn receives reflective light from said optical disc in order to scan and reproduce information recorded on said optical disc;
a motor control unit which controls said spindle motor based on a sync signal contained in a reproducing signal output from said light pickup at the time of reproduction;
a mirror detection unit which detects mirror information in relation to scanned mirror surfaces on said optical disc based on an RF signal corresponding to said reproducing signal when said optical disc runs away; and
a rotation control unit which detects the direction of rotation of said optical disc based on said mirror information detected by said mirror detection unit,
wherein said rotation control unit applies said spindle motor with a brake signal in the direction opposite to said detected direction of rotation, and
wherein the direction of rotation of said optical disc is detected by comparing an initial mirror count value obtained by counting a mirror pulse for a predetermined period of time every time said mirror surface which is detected based on said RF signal is scanned and a mirror count value during braking obtained by counting said mirror pulse for the predetermined period of time which is detected based on said RF signal when said spindle motor is applied with said brake signal.

5. The optical disc reproducing apparatus according to claim 4 further comprising:
a tracking servo mechanism which controls the tracking of said optical disc by said light pickup, wherein said rotation control unit includes:
first count value calculation means which calculates said initial mirror count value by counting for the predetermined period of time said mirror pulse detected based on said RF signal when said tracking servo mechanism is turned off;
second count value calculation means which calculates a mirror count value during braking by counting for the predetermined period of time said mirror pulse detected based on said RF signal when said spindle motor is applied with said brake signal; and
rotational direction detection means which detects the direction of rotation of said optical disc based on results of a comparison between the initial mirror count value calculated by said first count value calculation means and the mirror count value during braking calculated by said second count value calculation means,
in braking said optical disc that is running away, said spindle motor is applied with said brake signal in the reverse direction of rotation when said optical disc is detected to be rotating in the normal direction by said rotational direction detection means, and is applied with said brake signal in the normal direction of rotation when said optical disc is detected to be rotating in the reverse direction.

6. The optical disc reproducing apparatus according to claim 5, wherein said rotation control unit further includes tracking servo off means which turns off said tracking servo mechanism, after it has been shown that the laser light onto said optical disc has attained proper focus based on a focus error signal contained in said reproducing signal output from said light pickup before the calculation of said initial mirror count value of said first count value calculation means.

7. An optical disc reproducing apparatus comprising:
a spindle motor which drives the rotation of an optical disc;
a light pickup which emits laser light to said optical disc and in turn receives reflective light from said optical disc in order to scan and reproduce information recorded on said optical disc;
a motor control unit which controls said spindle motor based on a sync signal contained in a reproducing signal output from said light pickup at the time of reproduction;
a mirror detection unit which detects mirror information in relation to scanned mirror surfaces on said optical disc based on an RF signal corresponding to said reproducing signal when said optical disc runs away;
a tracking servo mechanism which controls the tracking of said optical disc by said light pickup, and
a rotation control unit which detects the direction of rotation of said optical disc based on said mirror information detected by said mirror detection unit,
wherein said rotation control unit applies said spindle motor with a brake signal in the direction opposite to said detected direction of rotation, and
wherein said rotation control unit includes:
first count value calculation means which calculates said initial mirror count value by counting for a predetermined period of time said mirror pulse detected based on said RF signal when said tracking servo mechanism is turned off;
second count value calculation means which calculates a mirror count value during braking by counting for the predetermined period of time said mirror pulse detected based on said RF signal when said spindle motor is applied with said brake signal; and rotational direction detection means which detects the direction of rotation of said optical disc based on the results of a comparison between the initial mirror count value calculated by said first count value calculation means and the mirror count value during braking calculated by said second count value calculation means, in braking said optical disc that is running away, said spindle motor is applied with said brake signal in the reverse direction of rotation when said optical disc is detected to be rotating in the normal direction by said rotational direction detection means, and is applied with said brake signal in the normal direction of rotation when said optical disc is detected to be rotating in the reverse direction.

8. The optical disc reproducing apparatus of claim 7, wherein said rotation control unit further includes a tracking servo off means which turns off said tracking servo mechanism, after it has been shown that the laser light onto said optical disc has attained proper focus based on a focus error signal contained in said reproducing signal output from said light pickup before the calculation of said initial mirror count value of said first count value calculation means.

* * * * *